United States Patent [19]
Castelli

[11] Patent Number: 4,858,522
[45] Date of Patent: Aug. 22, 1989

[54] AUTOMATIC ESPRESSO COFFEE MAKING MACHINE FOR HOUSEHOLD USE

[75] Inventor: Giovanni Castelli, Milan, Italy
[73] Assignee: Simac S.r.l., Italy
[21] Appl. No.: 260,062
[22] Filed: Oct. 20, 1988
[30] Foreign Application Priority Data
Oct. 23, 1987 [IT] Italy .................. 22402 A/87
[51] Int. Cl.⁴ ................................ A47J 31/42
[52] U.S. Cl. ................................ 99/280; 99/286; 99/289 R
[58] Field of Search .............. 99/279, 280, 281, 282, 99/283, 286, 287, 289 R, 293, 300; 426/433

[56] References Cited
U.S. PATENT DOCUMENTS

| | | | |
|---|---|---|---|
| 4,172,413 | 10/1979 | Roseberry | 99/286 |
| 4,188,863 | 2/1980 | Grossi | 99/286 |
| 4,406,217 | 9/1983 | Oota | 99/286 |
| 4,572,060 | 2/1986 | Yung-Kuan | 99/289 R |
| 4,667,586 | 5/1987 | Harada | 99/289 R |

*Primary Examiner*—Robert W. Jenkins
*Attorney, Agent, or Firm*—Robbins & Laramie

[57] ABSTRACT

An "espresso" coffee making machine for household use incorporates an electronic device linked operatively to a timer, a selector operative to dispense one or two doses of the espresso coffee, and a control knob for controlling the amount of water per coffee dose to be dispensed.

An electric coffee grinder and a feed pump for feeding water into the boiler are activated by the electronic device to operate for predetermined time periods clocked by the timer.

2 Claims, 5 Drawing Sheets

AUTOMATIC ESPRESSO COFFEE MAKING MACHINE FOR HOUSEHOLD USE

DESCRIPTION

This invention relates to an "espresso" coffee making machine for household use of a type which comprises a coffee grinder and an electric motor therefor, a percolation chamber, a chute between said coffee grinder and said percolation chamber for loading said chamber with a metered amount of ground coffee, a heated water storage boiler, and a pump having its delivery side in communication with said percolation chamber and its suction side in communication with said boiler.

As is known, espresso coffee makers of the type outlined above involve the following steps in operation: grinding a predetermined amount of bean coffee, feeding ground coffee powder into a percolation chamber, compressing the coffee powder in the percolation chamber to an appropriate extent, delivering hot water under pressure to said chamber in order to have a desired coffee percolate dispensed therefrom, and replacing the spent coffee charge.

Espresso coffee makers have been provided and are currently used which have a hot water storage boiler and a cylinder/piston assembly movable toward and away from the percolation chamber. The piston in that assembly is referred to as the percolating piston because it is kept in fluid communication with the boiler via a pump, and acts within the percolation chamber to compact the coffee powder and supply it with pressurized hot water.

Such machines are also provided with ejectors of the spent coffee charge comprising a disk plate movable between the bottom and inlet mouth of the percolation chamber, as well as a pusher means, substantially in the form of a doctoring blade, which is movable across the disk plate at the same height level as the inlet mouth of the percolation chamber.

U.S. Pat. No. 4,188,863 discloses a machine as aforesaid, wherein cold water is led to the percolating piston by gravity, to then undergo heating within the percolation chamber. A drive arrangement is also disclosed for operating off a common electric gear motor and at different times the coffee grinder and the percolating cylinder/piston assembly.

Such prior espresso coffee making machines, while performing satisfactorily for many an aspect, still have the well-recognized disadvantage of being highly complex in construction, thereby their reliability is made uncertain by relatively frequently occurring malfunctions, and their operation not fully automatic.

Further, and especially in a domestic environment, they fall short of the requirement to have automatic machines which can selectively dispense one or two doses of espresso coffee, while affording control of the amount of coffee percolate dispensed to obtain weak or strong coffee.

The technical problem underlying this invention is to provide an automatic espresso coffee making machine for household use which has such constructional and operational features as to enable delivery of one or two doses of coffee and, after making this selection, adjustment of the amount of coffee percolate, while obviating the disadvantages pointed out hereinabove in relation to similar prior machines.

This problem is solved by a machine as indicated being characterized in that it further comprises an electronic control device operatively linked to and driven by a timer in said device, a selector to selectively dispense one or more doses of espresso coffee, and a control knob for controlling the amount of coffee percolate to be dispensed, said electric motor and pump being in turn linked operatively to respective outputs of said device to be operated for predetermined time periods clocked by said timer.

The features and advantages of the automatic machine of this invention will become apparent from the following detailed description of a preferred embodiment thereof, to be taken by way of example and not of limitation in conjunction with the accompanying drawings.

Figure 1:
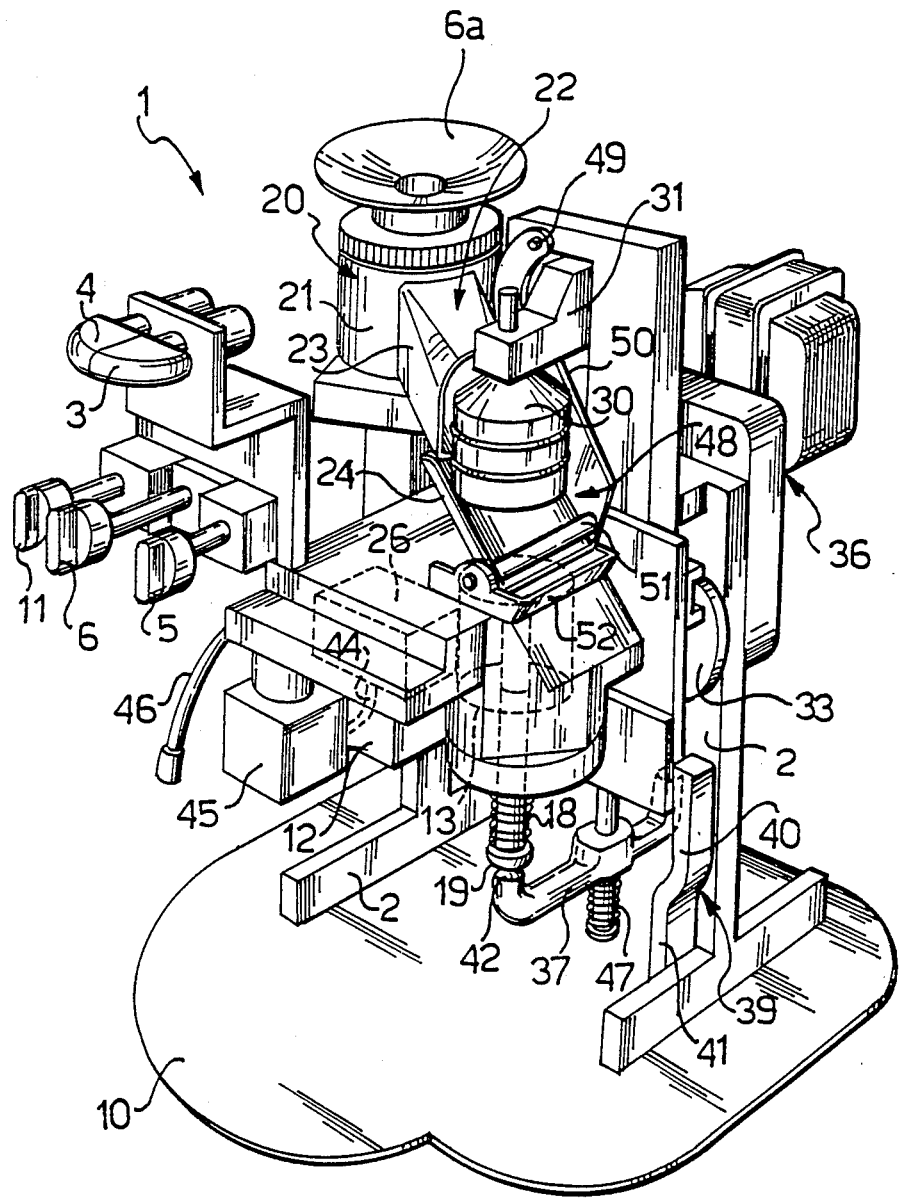
FIG. 1 is a vertical elevation perspective view of the machine according to the invention.
Figure 2:
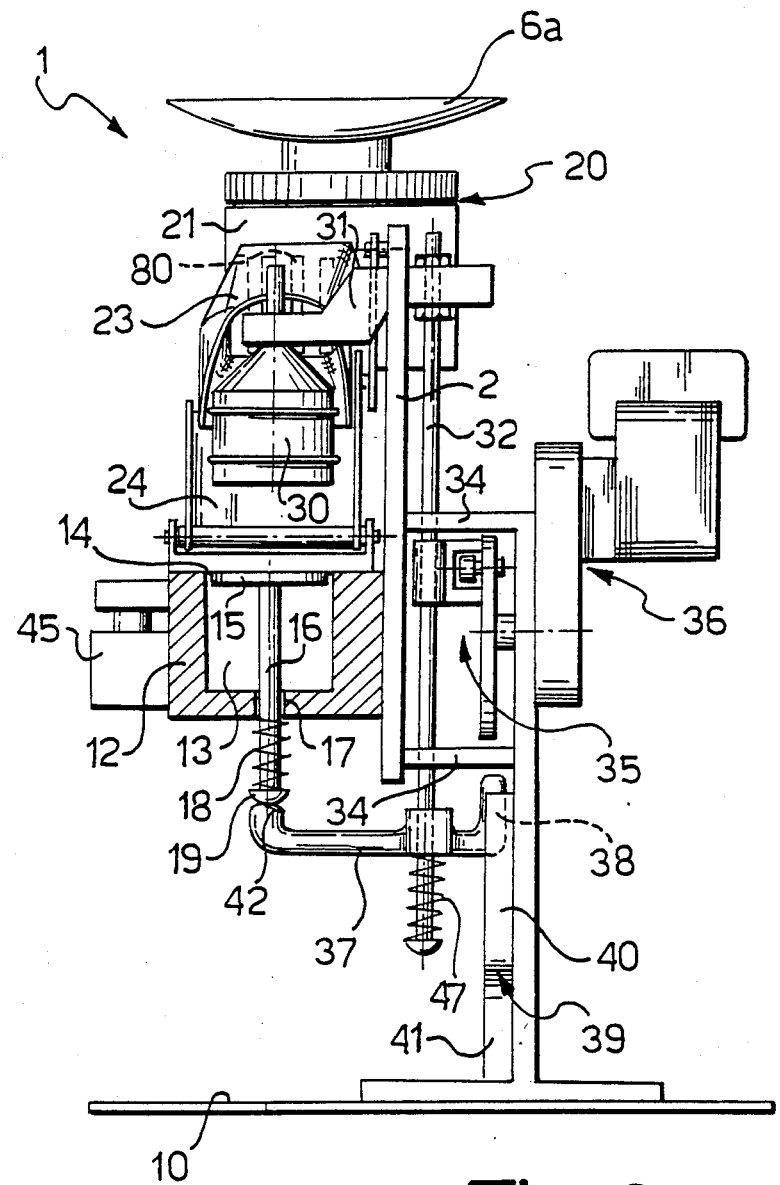
FIG. 2 is a side view of the machine shown in FIG. 1.
Figure 3:
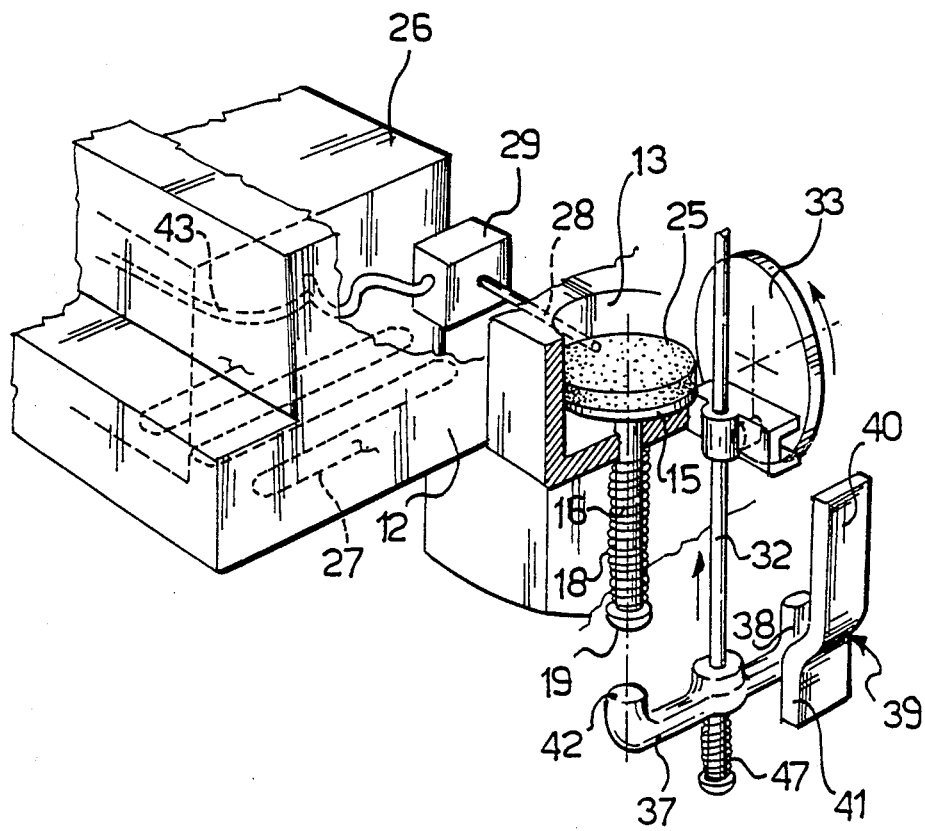
FIG. 3 is a part-sectional view showing schematically a detail of the machine of FIG. 1.

With reference to the drawing views, the numeral 1 generally designates an espresso coffee making machine for household use according to this invention.

The machine 1 comprises a base 10 and a supporting frame 2 upstanding on the base 10.

Figure 4:
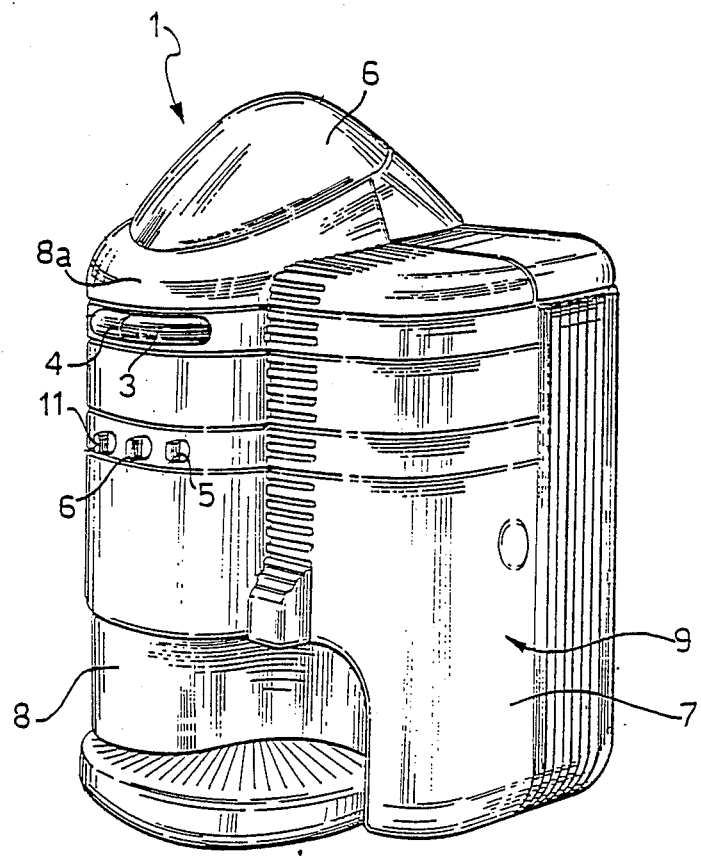
FIG. 4 is a perspective view of the protective outer case of the machine shown in FIG. 1.
Figure 5:
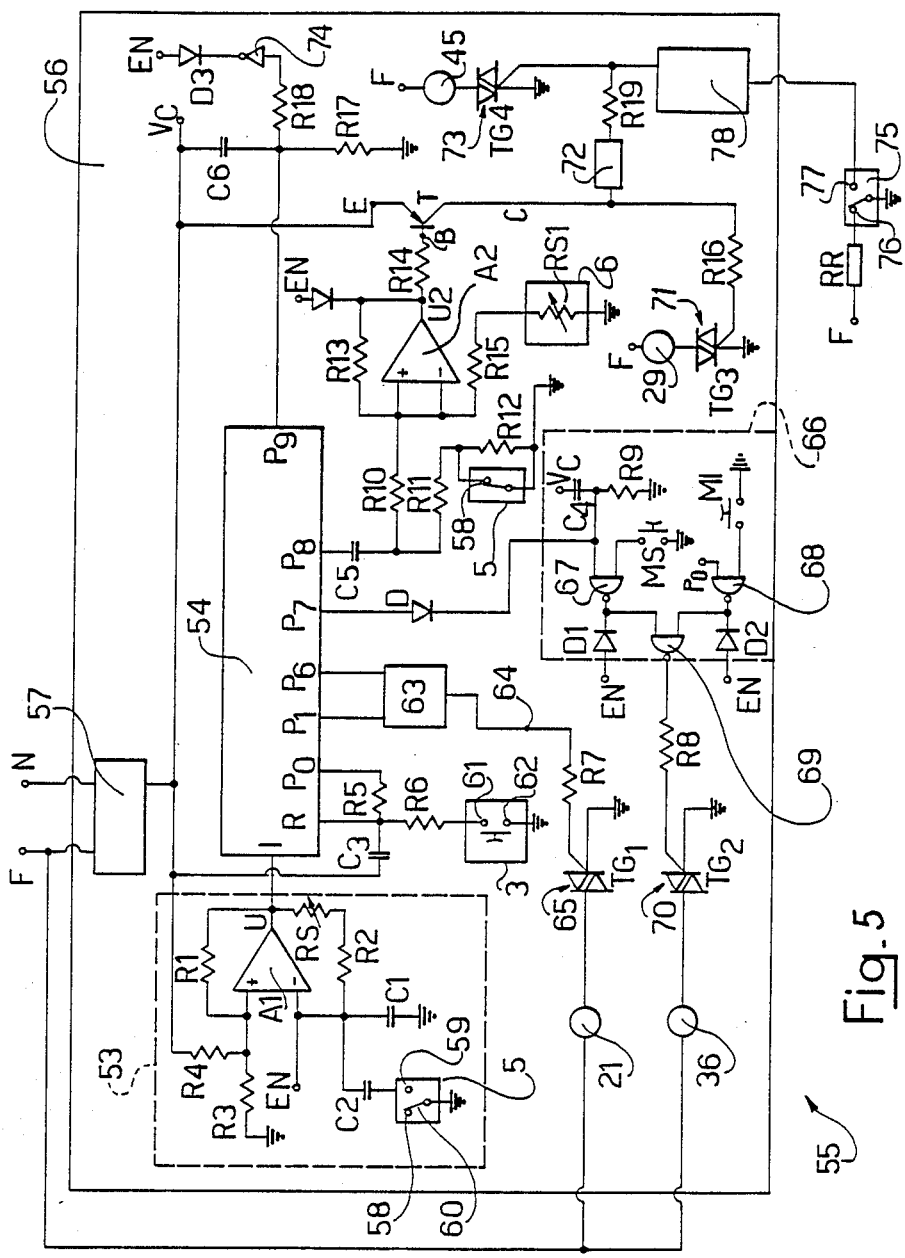
FIG. 5 is a schematical view of an electronic control device incorporated to the machine of FIG. 1.

The frame 2 is intended to provide support for the component parts of the machine 1 and a protective shroud body 9, shown in FIG. 4. The shroud body 9 comprises two portions 7 and 8, wherein the portion 8 is taller, has a top end 8a of conical shape with a rounded apex in which there is defined a translucid dome-shaped portion 6 intended to cover a conventional funnel-like seat 6a for receiving bean coffee.

Located on the front of the portion 8 of the shroud body 9 are the controls for the machine 1, namely:

a cut-out switch 4 for the power supply;

a pushbutton control 3 for activating an operation cycle of the machine 1;

a dispensing selector 5 for delivering one or two doses of espresso coffee;

a knob 6 for continuously controlling the amount of coffee percolate to be dispensed; and a second knob 11 for controlling the flow rate of the steam supplied to a delivery nozzle 46 of the machine 1.

Approximately halfway up the frame 2 and proximate the front thereof, there is mounted an aluminum block 12 in which a percolation chamber 13 is formed which has a cylindrical shape, vertical axis, and an inlet mouth 14 open upwardly. The chamber 13 is bounded at the bottom by a disk plate 15 having a slightly smaller diameter than the chamber 13 and being guided for movement in the direction of the chamber axis. In particular, the disk plate 15 is secured coaxially to the end of a stem 16 which is guided through a bore 17 formed in the block 12 at the bottom of the chamber 13.

A spring 18 fits around the stem 16, externally of the block 12, and is compressed between the block 12 and a mushroom-shaped end 19 of the stem 16. The disk plate 15 is displaceable upwards against the bias of the spring 18, as explained hereinafter, as far as the inlet mouth 14 of the chamber 13.

The chamber 13 is adapted to receive a predetermined of ground coffee from a grinder 20 driven by a respective electric motor 21. A chute 22 is also provided which extends from the lower portion of the grinder 20 to the inlet mouth 14. The chute 22 includes a first chute section 23 fast with the grinder 20 and equipped with a coil spring 80 for parting the flow of ground coffee, and a second chute section 24, construction-wise independent of the former, which is guided for movement in a transverse direction to the disk plate 15 and intended to provide a doctoring blade 52 for the ejection of a cake 25 of spent ground coffee, as explained hereinafter.

The block 12 is also advantageously formed with a boiler 26, equipped with electric resistance heaters 27, which is in fluid communication with the percolation chamber 13 via a conduit 28. Also connected in said conduit 28 is a fluid cut-off solenoid valve 29.

The machine 1 further comprises a piston 30 sized to fit with slight clearance into the chamber 13 so as to compact the ground coffee charge and carried on the end of a bracket 31 in a position opposite the disk plate 15 and an axis lying in a vertical direction.

The bracket 31 is connected to a drive, generally indicated at 35, which is associated with an electric gear motor 36. The piston 30 is reciprocated toward and away from said chamber 13 by the gear motor 36.

The bracket 31 is attached perpendicularly to a rod 32, which is conventionally affixed at an offcentered location to an operating disk 33 driven by the gear motor 36. The rod 32 is guided in its vertical movement by a guide bracket 34 mounted to the frame 2.

The bottom end of the rod 32 is a unitary construction with a second bracket 37 extending horizontally toward the front of the machine 1 and having an end 42. That bracket 37 is provided with a projection 38 at an opposite location from the rod 32 and with a restoring spring 47.

The projection 38 is intended to form a feeler on an elevation 39 of the frame 2. More specifically, that elevation 39 comprises a first section 40 extending vertically and merging into a second section 41 adapted to form a step cam for the projection feeler 38.

The vertically downward movement of the rod 32 enables the projection 38 to follow the elevation 39 and, in the transition from the section 40 to the section 41, to shift the bracket 37 angularly such that its end 42 is brought to a position beneath the mushroom-shaped end 19 of the stem 16 of the disk plate 15.

The machine 1 further comprises a pump 45 for pumping water into the percolation chamber 13. Said pump 45 dips into a water reservoir, not shown because known per se, and is in fluid communication with the boiler 26 by means of a conduit 44.

Branched off the conduit 28 between the boiler 26 and the percolation chamber 13 is an additional conduit 43 which leads to a high pressure steam delivery nozzle 46. Located at the conduit 43 branching point from the conduit 28 is a mechanical change-over valve, not shown, associated with the knob 11.

A lever 48 is pivoted at 49 on the frame 2 which has a restoring spring, not shown because known per se, above the bracket 31 and its side 50 facing said bracket 31 cam-shaped. The opposed end 51 of the lever 48 is attached to the second section 24 of the chute 22 to drive the doctoring blade-like end 52 of the chute in a direction across the disk plate 15.

Making specific reference to FIG. 4, an electronic control device 55 incorporated to the machine 1 will be now described. This electronic control 55 comprises an electronic substrate card 56 connected electrically to a power supply 57, known per se, which is operative to supply a positive low voltage level VC. The power supply 57 has its input end connected to the phase pole F and neutral pole N of 220 Volts power mains.

The device 55 includes an oscillator 53 which is intended to form a timer for said device and is connected to the selector 5, which has a ground contact 60 movable between a pair of fixed contacts 58 and 59. The oscillator 53 includes an operational amplifier A1 whose output U is fed back to both the non-inverting and inverting inputs, respectively via a resistor R1 and serially connected resistor R2 and rheostat RS.

The inverting input of the amplifier A1 is also grounded, via a capacitor C1 to an enable terminal EN and the fixed contact 59 of the selector 5 whereby two doses of espresso coffee are dispensed.

The non-inverting input of the amplifier A1 is conventionally grounded via a resistor R3 and connected to the pole VC via a resistor R4.

The output U of the oscillator 53 is connected directly to an input I of a sequencing circuit 54 of the IC type, which has a number of outputs, as specified herein below, adapted to be made electrically alive in a selective sequential manner.

The first, PO, of said outputs is connected via a resistor R5 to a second or reset input R of the sequencer 54, and to a fixed contact 61 of the pushbutton control 3 via a resistor R6. The other fixed contact 62 of the pushbutton control 3 is grounded, whilst the reset input R is also connected to the pole VC via a capacitor C3.

The next output pair, P1 and P6, of the sequencer 54 are connected to the inputs of a storage cell 63 whose output 64 is connected via a resistor R7 to an electric actuator 65, specifically a trigger TG1, connected between ground and one end of the electric motor 21 associated with the grinder 20. The other end of the motor 21 is connected to the phase conductor F.

The sequencer 54 comprises a fourth output P7 which is connected, via a diode D, to a control logic 66 for the gear motor 36 of the machine 1.

In particular, the output P7 is connected to the first input of a logic NAND gate 67 which is also connected to ground via a resistor R9 and to the pole VC via a capacitor C4. The second input of the gate 67 is grounded via a microswitch MS which constitutes a top dead center detector for the piston 30.

A second logic NAND gate 68 has one input connected to the output PO of the sequencer 54 and the other input grounded via a second microswitch MI adapted to form a bottom dead center detector for the piston 30.

The respective outputs of the gates 67 and 68 are connected to the inputs of a third logic gate 69 and to the enable terminal EN of the oscillator 53 via respective diodes D1 and D2.

The output of the gate 69, and hence, of the circuit 66 is connected via a resistor R8 to an actuator 70, specifically a trigger TG2, connected to the gear motor 36 of the machine 1.

The next output P8 of the sequencer 54 is connected via a capacitor C5 and resistor R10 to the non-inverting input of an operational amplifier A2 and to ground via a resistive divider comprising the serially connected resistors R11 and R12. Between said resistors R11 and R12 there is connected the fixed contact 58 of the selector 5 for operation to dispense one dose of espresso coffee.

A rheostat RS1 associated with the control knob 6 for controlling the amount of coffee percolate is connected via a resistor R15 between ground and both inputs of the amplifier A2, which amplifier has its output U2 connected in feedback configuration to the non-inverting input via a resistor R13 and to the enable terminal EN of the oscillator 53. The output U2 is also connected, via a resistor R14, to the base B of a transistor T of the pnp type having its emitter E connected to the pole VC and its collector C connected via a resistor R16 to an actuator 71, specifically a trigger TG3, which is in turn connected to control the solenoid valve 29, mounted in the water supply conduit 28 to the percolation chamber 13, to open.

The above-mentioned collector C is further connected, via a delay circuit 72 and resistor R19, to a further actuator 73, specifically a fourth trigger TG4 connected to the pump 45.

A further output P9 of the sequencer 54 is connected to ground via a resistor R17, to the pole VC via a capacitor C6, and an inverter 74 via a resistor R18. The output of the inverter 74 is connected to the enable terminal EN via a diode D3.

Lastly, the control knob 11 for the pressurized steam is associated with an electric change-over switch 75 which comprises a fixed contact 76 connected to the phase conductor F via a resistor RR and a second fixed contact 77 connected, via a power circuit 78, to the actuator 73 associated with the pump 45, thereby the pump 45 is operated to automatically top up the boiler 26 with water as steam under pressure is being delivered.

A preferred embodiment of a novel method for preparing espresso coffee on the automatic machine 1 of this invention will be now described. In this example, an initial state will be assumed in which the machine 1 is at any stage of its operation cycle.

By turning on the cut-out switch 4 of the machine 1, electric power is supplied to both the electronic control circuit 55 and the resistance heaters 27 of the boiler 26 which will bring the water contained in the boiler to temperature.

On turning on the machine 1, the gear motor 36 also becomes operative to complete an idle up and down cycle of the compression piston 30 in order to restore the machine 1 to a starting condition of its operation cycle.

At this time, the user may decide to prepare one or two doses of espresso coffee while adjusting the amount of the coffee percolate to be dispensed by the machine 1 (weak or strong coffee).

In this respect, one can switch the movable contact 60 of the selector 5 to either fixed contact, 58 or 59, respectively for dispensing one or two doses of espresso coffee.

At the same time, the user can adjust the amount of the coffee percolate by means of the knob 6 acting on the rheostat RS1. On the temperature of the water within the boiler 26 reaching a predetermined level, as sensed by a conventional thermistor, a lamp contained in the pushbutton 3 is turned on automatically to visually indicate that the machine 1 is ready to perform an operation cycle.

The oscillation frequency of the timer/oscillator 53 is factory set by means of the rheostat S; however, by moving the selector 5 to the second fixed contact 59, the capacitance value to ground seen by the inverting input of the amplifier A1 of that oscillator 53 is reduced, thereby altering its oscillation frequency.

By depressing the control pushbutton 3, the operation cycle of the machine 1 is started. The reset input R of the sequencer 54 is brought to a sufficient voltage level to enable the sequential supply cycle of the sequencer 54 outputs to begin.

The first output pair of P1 and P6 power the storage cell 63 and, accordingly, the electric motor 21 of the grinder, for a time period which is determined by the oscillator 53 scan dependent on the selector 5 positioning. In a preferred embodiment, these time periods have been set to seven seconds for grinding the required amount of coffee for a single dose of espresso coffee, and ten seconds for preparing two such doses.

These times correspond to the grinding of approximately 6 and 9 grams coffee, respectively.

The ground coffee falls through the coil spring 80 onto the chute 22 which will convey it to the percolation chamber 13.

At this stage of the operation cycle, a short duration pause is provided to allow for the whole amount of coffee to drop into the percolation chamber 13.

Thereafter, and through the output P7 of the sequencer 54, the control device 55 will energize the gear motor 36 of the machine 1, which then drives the assembly 35 to move the rod 32 vertically in the guide bracket 34 and enable the piston 30 to compact the ground coffee charge in the chamber 13. Compaction of the ground coffee charge 25 is controlled by the spring 18 calibration.

During the downward stroke of the piston 30, the projection 38 of the bracket 37 will follow the elevation 39 on the frame 2 feeler fashion to cause the bracket 37 to move angularly until its end 42 locates underneath the end 19 of the stem 16 associated with the bottom disk plate 15.

The output from the logic gate 68 disables the oscillator 53 until the rod 32 of the piston 30 trips in its downward movement the microswitch MI.

The next step consists of actuating the pump 45 for a predetermined time duration which is connected to the boiler 26 to supply hot water under pressure to the coffee charge 25 in the chamber 13.

The water supply step duration is controlled with the knob 6, and hence the rheostat RS1, to lie within a range of values which is a function of the position of the selector 5 and of the resulting voltage levels on the resistive divider R11, R12.

Further, the pump 45 is activated after a predetermined time delay set by the circuit 72, since the solenoid valve 29 would be first opened to permit of te charge 25 wetting prior to its irrigation with pressurized hot water.

The percolation step is followed by a pause of a few seconds for the charge 25 to dry. This pause is provided by the output P9 from the sequencer 54 disabling the oscillator 53 for a few seconds via the enable input EN.

Thereafter, the gear motor 36 is again energized to raise the piston 30, thereby the bottom disk plate 15 of the chamber 13 is raised by the end 42 of the bracket 37 exerting a thrust force on the end 19 of the stem 16 of that disk plate 15.

In approaching its top dead center, the piston will interfere with the camming side 50 of the lever 48 connected to the second section 24 of the chute 22. The movement of the lever about its pivot center 49 brings the end 52 of the chute 24 to contact the spent caked charge 25 presently reaching up to the rim of the chamber 13.

Thus, the spent coffee charge cake is taken away into a collector compartment formed laterally of the block 12 integrally with the shroud body 9.

On reaching its top dead center, the piston 30 will trip the microswitch MS and disable the oscillator 53 via the logic gate 67 of the circuit 66.

The cycle is over at this stage and the original situation is restored wherein the machine is ready to start a fresh cycle.

The coffee making machine according to the invention has therefore the important advantage of being fully automatic in operation, and peculiarly versatile in that the faculty is afforded for the user to prepare one or two doses of espresso coffee and, after taking his/her decision, adjust for the desired amount of the percolate.

Other advantageous aspects are its simple construction and reliable operation. This machine has, moreover, an operation cycle of peculiarly short duration.

I claim:

1. An automatic "espresso" coffee making machine for household use of a type which comprises a coffee grinder and an electric motor therefor, a percolation chamber, a chute between said coffee grinder and said percolation chamber for loading said chamber with a metered amount of ground coffee, a heated water storage boiler, and a pump having its delivery side in communication with said percolation chamber and its suction side in communication with said boiler, characterized in that it further comprises an electronic control device operatively linked to and driven by a timer in said device, a selector to selectively dispense one or more doses of espresso coffee, and a control knob for controlling the amount of coffee percolate to be dispensed, said electric motor and pump being in turn linked operatively to respective outputs of said device to be operated for predetermined time periods clocked by said timer.

2. A machine according to claim 1, characterized in that said percolation chamber is formed in a block also accommodating said boiler, said chamber and said boiler being in fluid communication with each other via a conduit wherein a fluid cut-off solenoid valve intervenes and is in turn connected electrically to an output of said electronic control device.

* * * * *